March 17, 1953  J. SKOVERA  2,631,474

GEARED PULLEY

Filed Nov. 30, 1948

INVENTOR.
John Skovera

Patented Mar. 17, 1953

2,631,474

UNITED STATES PATENT OFFICE 2,631,474

GEARED PULLEY

John Skovera, Chicago, Ill.

Application November 30, 1948, Serial No. 62,740

5 Claims. (Cl. 74—665)

This invention relates to a power transmission device and particularly to a compact cylindrical or single ball bearing transmission of high efficiency that permits the driving of heavier loads from a comparatively small power source.

Speed changers involving complicated transmissions have been made and used extensively, particularly for driving heavy loads. Such devices are expensive and notorious for consuming power by the inherent friction losses which they introduce. Contrary to usual practice, I have been able to transmit much heavier power loads with my transmission than has been possible with conventional transmissions.

The particular object of the present invention is to provide a cylindrical ring or single ball bearing power transmitting device that will drive heavier loads from a small power source.

Another object is to combine a light belt power driving pulley transmission with a heavier gear transmission.

Still another object is to combine a light belt power driving with a heavier V belt driving.

Figure 1:
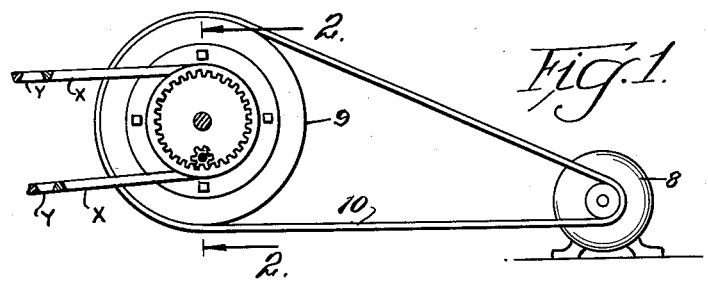
Figure 2:
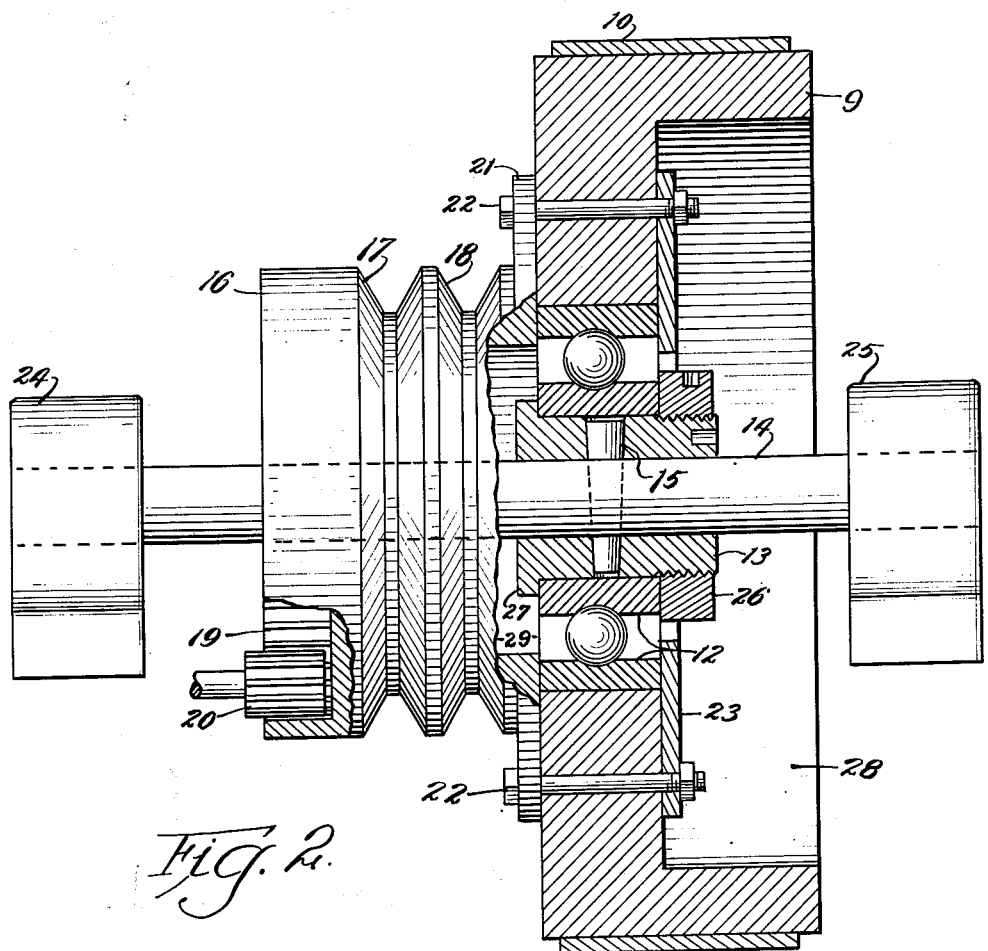

Other objects and benefits will be disclosed in the following description and drawings in which:

Fig. 1 is an elevation view of my transmission being driven by a small high speed motor as will later be explained; and Fig. 2 is an enlarged transverse view of my transmission partly in section as taken substantially along the line 2—2 in Fig. 1 to better disclose the arrangement of parts.

Now referring to the drawings and at the outset to Fig. 1, I show my transmission with driven pulley 9 being driven by a small electric motor 8 by means of a belt 10. On the opposite side of the power transmission are the driven V belts X and Y to balance the tension of the belt 10 as will later be explained.

Now referring to Fig. 2, I show the motor drive belt 10 encircling the driven pulley 9 of the transmission and this pulley 9 is rotatably carried by means of a single ball bearing 12 as shown. It will be noted that the ball bearing 12 is positioned in a selected plane disposed radially to the axis of rotation of the transmission and which plane is disposed intermediate the operative plane of the belt 10 and the planes of the driven belts X and Y to thereby better balance the tension between the belt 10 and the belts X and Y. The ball bearing 12 is mounted on a center cylindrical ring or cone 13 securely fixed to the stationary shaft 14 by means of a taper pin 15. Attached to the driven pulley 9 is a belt drive pulley 16 having V belt notches 17 and 18 disposed adjacent the driven pulley 9 with pulley 16 driving belts such as X and Y to drive a machine. On the internal periphery at the open face of the belt drive pulley 16 is provided an internal gear 19 arranged to drive a pinion 20 as shown. The shaft from the driven pinion 20 may be attached to any desired machine and naturally, by reason of the ratios involved, this machine would be so driven at a relatively high speed.

The belt drive pulley 16 is mounted on the driven pulley 9 by means of a flange 21 securely bolted to the face of the driven pulley 9 by means of bolts 22 and the bolts 22 pass through the web of the driven pulley 9 to connect with a backing disc member 23 as shown. It will be appreciated that by this construction pulley 9 and pulley 16 are together carried upon the ball bearing 12 that is operatively held in place on the flanged cylindrical threaded ring or cone 13 and threaded collar 26 provides means which secures the ball bearing against the flange 27 on the cylindrical ring 13.

It will be appreciated that the shaft 14 resting in support blocks 24 and 25 does not rotate and that there is no contact with the pulleys 9 and 16 because of the central recesses 28 and 29 in the pulleys 9 and 16.

From the foregoing description and explanations, it will be appreciated that my entire transmission device is mounted on a non-rotating shaft 14 and rotates entirely on the single anti-friction bearing 12 which is supported on the shaft 14. I thus provide a very simple, compact transmission mounted on a single ball bearing located intermediate the planes of the driven and driving belts, and with the mechanical advantages interposed into the transmission through the ratio relationships between the several driven and driving elements I am enabled to transmit greater power at less speeds than has been heretofore accomplished. The proposed transmission has wide application. It can be employed on general machine shop machines as well as bicycles, trucks, automobiles, generators, battery chargers, gas engines, aeroplanes and power and heating plants.

Having thus described my device, I now claim as new:

1. In a power transmission device, a stationary support, an anti-friction bearing mounted for rotation in fixed relation upon said support, a pair of connected power transmission units solely mounted for rotation upon the periphery of said anti-friction bearing and out of contact with said stationary support, and fastening means to releasably connect said pair of power transmission units together for concerted rotation upon said bearing periphery, said fastening means including coacting parts arranged to straddle said bearing to maintain said power transmission units in a predetermined relation upon the periphery of said bearing.

2. In a power transmission device, a stationary support, an anti-friction bearing mounted for rotation in fixed relation upon said support, a pair of connected power transmission units solely mounted for rotation upon the periphery of said anti-friction bearing and out of contact with said stationary support, fastening means to releasably connect said pair of power transmission units together for concerted rotation upon said bearing periphery, said fastening means including coacting parts arranged to engage opposite portions of said bearing to maintain said power transmission units in a predetermined relation upon the periphery of said bearing and power reduction mechanism operatively connected with at least one of said power transmission units to further increase the overall mechanical advantage of the power transmission device.

3. A power transmission device comprising a fixed support member, a power transmission unit, and operable means to carry said transmission unit for rotation relatively to said support member comprising a sleeve encircling said support member, means to secure said sleeve to said member, an anti-friction bearing mounted upon said sleeve and spaced radially about said support member, and cooperative retaining means carried by said sleeve to releasably hold said bearing in a given relation therein and with respect to said support member, and said power transmission unit being rotatably supported by said bearing and secured thereto for free rotation about said support member and in spaced relation with respect thereto.

4. A power transmission device comprising a fixed support member, a power transmission unit, and operable means to carry said transmission unit for rotation relatively to said support member comprising a sleeve encircling said support member, means to secure said sleeve to said member, an anti-friction bearing mounted upon said sleeve and spaced radially about said support member, and cooperative retaining means carried by said sleeve to releasably hold said bearing in a given relation therein and with respect to said support member, and said power transmission unit being rotatably supported by said bearing and secured thereto for free rotation about said support member and in spaced relation with respect thereto, said power transmission unit comprising separable driven and drive elements, fastening means to releasably connect said elements together, said fastening means having cooperative means to engage opposite portions of said antifriction bearing to rigidly maintain said transmission unit in operable relation upon said bearing and in a position away from said support member.

5. In a power transmission device, a stationary supported shaft, a ball bearing support comprising a cylindrical ring encircling said shaft and having means to secure said ring to the shaft, a single ball bearing fixed for rotation upon said cylindrical ring, a driven pulley mounted upon the single ball bearing, a drive pulley mounted on the driven pulley, a drive gear carried by said drive pulley, said pulleys being entirely supported upon the ball bearing in separated relationship to the supported shaft, and a power take-off pinion connected at one peripheral point of tangency with said drive gear of the drive pulley.

JOHN SKOVERA.

REFERENCES CITED

The following references are of record in the file of this patent:

UNITED STATES PATENTS

| Number | Name | Date |
|---|---|---|
| 2,025,834 | Tautz | Dec. 31, 1935 |
| 2,253,591 | Travis et al. | Aug. 26, 1941 |
| 2,396,860 | Lee | Mar. 19, 1946 |
| 2,439,520 | Miller | Apr. 13, 1948 |